United States Patent
Salam et al.

(10) Patent No.: US 9,764,270 B2
(45) Date of Patent: Sep. 19, 2017

(54) METHOD OF SYNTHESIZING MANGANESE OXIDE NANOCORALS

(71) Applicant: KING ABDULAZIZ UNIVERSITY, Jeddah (SA)

(72) Inventors: Mohamed Abdel Salam, Jeddah (SA); Lateefa Al-Khateeb, Jeddah (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 0 days.

(21) Appl. No.: 14/958,913

(22) Filed: Dec. 3, 2015

(65) Prior Publication Data
US 2017/0157551 A1 Jun. 8, 2017

(51) Int. Cl.
| | | |
|---|---|---|
| C01G 45/00 | (2006.01) |
| B01D 53/00 | (2006.01) |
| B01J 23/34 | (2006.01) |
| B01J 35/00 | (2006.01) |
| B01J 35/02 | (2006.01) |
| B01J 35/10 | (2006.01) |
| B01J 37/03 | (2006.01) |
| B01J 37/04 | (2006.01) |
| B01J 37/02 | (2006.01) |
| B01J 37/08 | (2006.01) |
| C01G 45/02 | (2006.01) |

(52) U.S. Cl.
CPC .............. B01D 53/00 (2013.01); B01J 23/34 (2013.01); B01J 35/0013 (2013.01); B01J 35/023 (2013.01); B01J 35/1019 (2013.01); B01J 35/1038 (2013.01); B01J 37/0236 (2013.01); B01J 37/031 (2013.01); B01J 37/04 (2013.01); B01J 37/08 (2013.01); C01G 45/02 (2013.01); C01P 2004/30 (2013.01); C01P 2006/12 (2013.01); C01P 2006/14 (2013.01)

(58) Field of Classification Search
CPC ................................ C01B 31/20; C01G 45/02
See application file for complete search history.

(56) References Cited

U.S. PATENT DOCUMENTS 6,517,802 B1  2/2003  Xiao et al.

FOREIGN PATENT DOCUMENTS

CN  102120619 A  7/2011

OTHER PUBLICATIONS

Liang, Shuhui, et al. "Effect of phase structure of MnO2 nanorod catalyst on the activity for CO oxidation." The Journal of Physical Chemistry C 112.14 (2008): 5307-5315.*

(Continued)

*Primary Examiner* — Richard M Rump
(74) *Attorney, Agent, or Firm* — Richard C. Litman

(57) ABSTRACT

A method of synthesizing manganese oxide nanocorals comprises the steps of a) heating a potassium permanganate solution; (b) providing manganese sulfate in a basic solution; (c) combining the manganese sulfate basic solution drop-wise with the heated potassium permanganate solution until a brown precipitate is formed; (d) stirring the brown precipitate for a period of about 12 hours at a temperature greater than 300 K; (e) isolating the precipitate; and (f) drying the precipitate inside an oven at a temperature greater than 300 K to provide manganese oxide nanocorals. The manganese oxide nanocorals include nanowires having a diameter typically ranging from about 20 nm to about 40 nm.

9 Claims, 6 Drawing Sheets

(56) References Cited

OTHER PUBLICATIONS

Salam, Mohamed Abdel. "Synthesis and characterization of novel manganese oxide nanocorals and their application for the removal of methylene blue from aqueous solution." Chemical Engineering Journal 270 (2015): 50-57.*

Shao, Wei, et al. "Mangnese Dioxide Nano-Crystal as Catalyst to Remove Formaldehyde." Advanced Materials Research. vol. 298. Trans Tech Publications, 2011.*

Mohamed Abdel Salam, "Synthesis and Characterization of Novel Manganese Oxide Nanocorals and their Application for the Removal of Methylene Blue from Aqueous Solution," Chemical Engineering Journal 270, 50-57 (2015).

* cited by examiner

METHOD OF SYNTHESIZING MANGANESE OXIDE NANOCORALS

BACKGROUND OF THE INVENTION

1. Field of the Invention

The present invention relates generally to catalysts, and particularly to a method of synthesizing manganese oxide nano-corals for catalytic oxidation of carbon monoxide (CO) to carbon dioxide ($CO_2$).

2. Description of the Related Art

Anthropogenic activities such as power plants and transportation industries, in addition to various domestic activities, contribute greatly to the emission of carbon monoxide (CO) in the world. About 1.09 billion tons of CO was emitted in the year 2000, for example. Carbon monoxide emission is considered one of the most serious environmental problems that threaten the existence of life on earth. This is because of its great affinity to blood hemoglobin, which can trigger serious health and respiratory problems. Hence, it is crucial to reduce this serious pollutant either by controlling its emission and/or by reducing its concentration in the environment.

One of the important methods used for the removal of carbon monoxide (CO) from the air is through the oxidation of CO into $CO_2$ via a catalytic pathway using different catalysts. Among the most promising metal oxides used for the oxidation of CO to $CO_2$ are manganese oxide catalysts. Conventional synthesis methods of these manganese oxide catalysts are laborious and require many steps in order to obtain the catalyst in its activate form. Although, both transition and noble metals oxides are used as catalysts for the CO oxidation, the search for a new type of catalyst for the removal of CO from air still remains a great challenge.

Thus, a method of producing manganese oxide nanocorals (MONCs) solving the aforementioned problems is desired.

SUMMARY OF THE INVENTION

A method of synthesizing manganese oxide nanocorals comprises the steps of a) heating a potassium permanganate solution; (b) providing manganese sulfate in a basic solution; (c) combining the manganese sulfate basic solution drop-wise with the heated potassium permanganate solution until a brown precipitate is formed; (d) stirring the brown precipitate for a period of about 12 hours at a temperature greater than 300 K; (e) isolating the precipitate; and (f) drying the precipitate inside an oven at a temperature greater than 300 K to provide manganese oxide nanocorals. The manganese oxide nanocorals include nanowires having a diameter typically ranging from about 20 nm to about 40 nm.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

A method of synthesizing manganese oxide nanocorals (MONCs) includes combining a manganese sulfate basic solution with a potassium permanganate solution. The potassium permanganate solution can be heated, for example to a temperature of about 343 K (70° C.), and stirred at a speed of about 600 rmp using a heater/magnetic stirrer prior to combining with the manganese sulfate basic solution. The manganese sulfate basic solution can be added drop-wise to the potassium permanganate solution until a brown precipitate is formed. The brown precipitate can be stirred at a temperature greater than 300 K. For example, the brown precipitate can be heated to a temperature of about 343 K and stirred overnight or for a period of about 12 hours. The brown precipitate can be isolated and dried inside an oven, e.g., at a temperature greater than 300 K, e.g., 383 K, to provide manganese oxide nanocorals. The manganese oxide nanocorals can include nanowires having a diameter ranging from about 20 nm and 40 nm and typically. The manganese oxide nanocorals can have a sea coral shape. The manganese oxide nanocorals can include nanocrystalline orthorhombic γ-$MnO_2$ phase. The manganese oxide nanocorals have Brunauer, Emmett and Teller (B.E.T.) surface area equal to about 168.9 $m^2$ $g^{-1}$, and total pore volume of about 0.0742 $cm^3$ $g^{-1}$.

The manganese oxide nanocorals can be used to remove toxic carbon monoxide from air by oxidizing CO. The method of converting carbon monoxide to carbon dioxide can comprise passing carbon monoxide and oxygen at a ratio of 1:1 over manganese oxide nanocoral surface at a fixed temperature and at a fixed applied pressure. The temperature is held between 348 to 423 K and the pressure is held at about 4 Torr. The process can be endothermic. The conversion efficiency from carbon monoxide to carbon dioxide is generally 100%. For example, 100% conversion can be achieved within 50 minutes using about 0.1 gram MONCs at 423 K, or within 60 minutes using 0.2 gram MONCs at 348 K, or within 30 minutes using about 0.4 gram MONCs at 348 K. The following examples will further illustrate the synthetic processes of making the manganese oxide nanocorals and its application in removing carbon monoxide.

EXAMPLE 1

Synthesis of the MONCs

Potassium permanganate solution (75 ml, 0.5M) was heated to 343 K (70° C.) and stirred at 600 rpm using a heater/magnetic stirrer. Sodium hydroxide (NaOH) solution (50 ml, 2.5 M) and manganese sulfate solution (75.0 ml, 2.0M) were then added drop-wise to the hot potassium permanganate solution using two separate burettes until a brown precipitate formed. The brown precipitate was then stirred over night at 343 K, filtered, washed with de-ionized water and then dried in an oven at 383 K (100° C.). The $MnO_2$ was formed according to the following equations:

Figure 1:
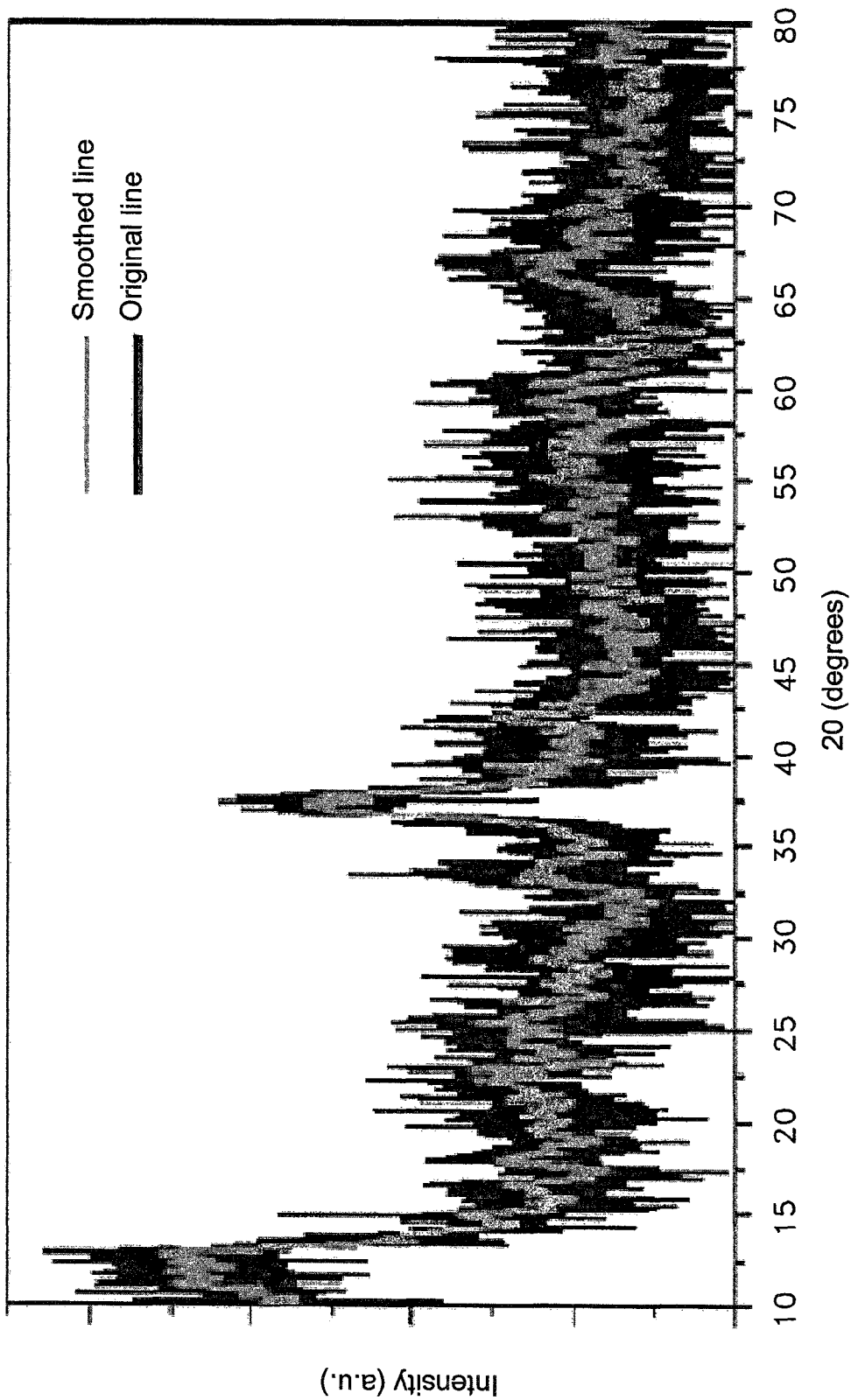
FIG. 1 shows the X-ray powder diffraction (XRD) pattern for the manganese oxide nanocorals (MONCs).

The crystalline structure and the identity of the as-prepared manganese oxide were explored using XRD analysis. FIG. 1 shows the XRD recorded for the manganese oxide nanostructures. The XRD measurement of the manganese oxide showed a pattern similar to crystalline orthorhombic γ-$MnO_2$ phase, as observed in a previous study, with broad peaks at (2θ=23.5°, 37.1°, 42.5°, 56.3°) and a single peak at (2θ)=66.8° of δ-MnO2 phase. MONCs mainly include nanocrystalline orthorhombic γ-$MnO_2$ phase. The broadness of the peaks indicate that the formed compound exists predominantly in nano-scale. According to the Scherrer equation, the crystallite size is inversely related to the FWHM (full width at half maximum) of an individual peak. This is because of the periodicity of the individual crystallite domains, in phase, reinforcing the diffraction of the X-ray beam, resulting in a tall narrow peak. If the crystals are defect free and periodically arranged, the X-ray beam is diffracted to the same angle even through multiple layers of the specimen.

Figure 2A:
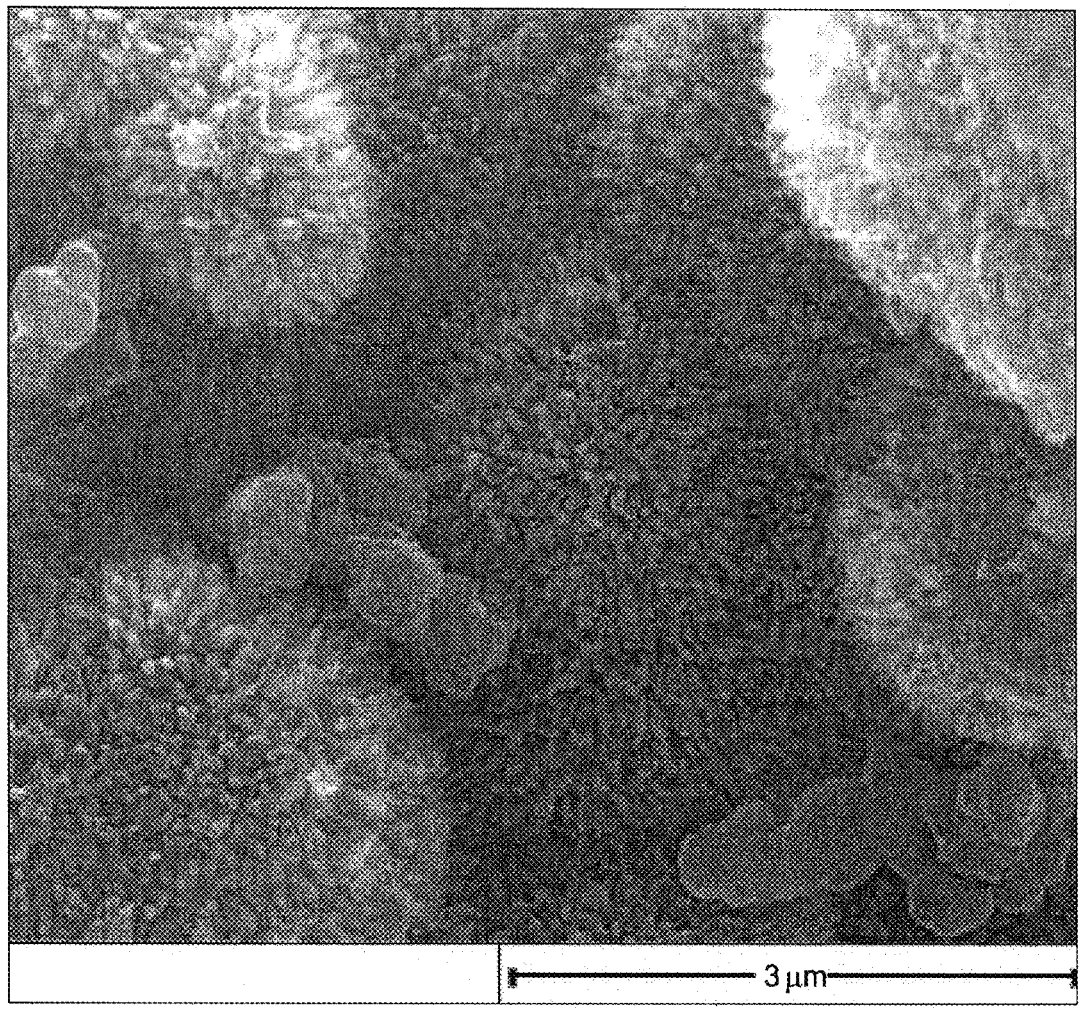
FIGS. 2A-2B show the scanning electron microscope (SEM) images for the MONCs.
Figure 2B:
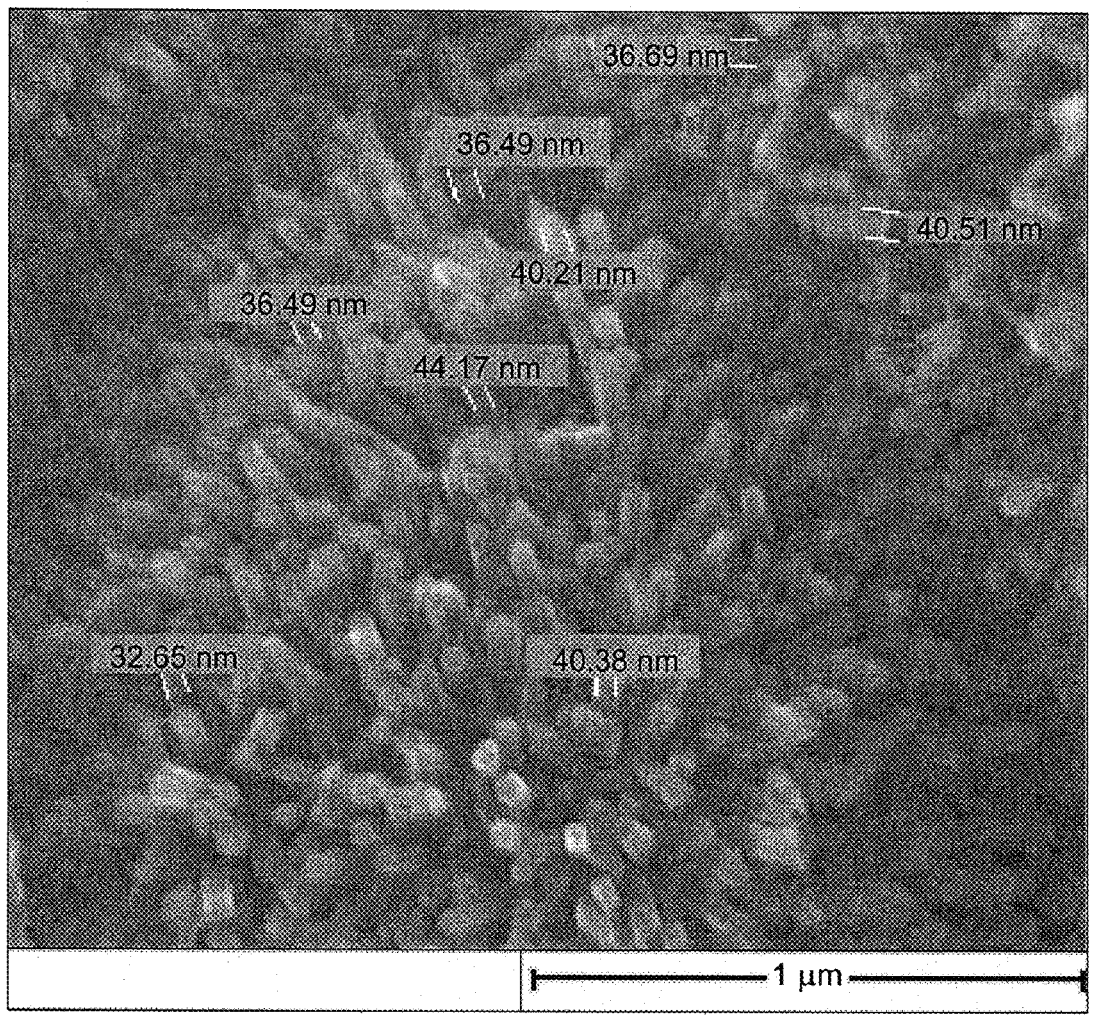
Figure 3:
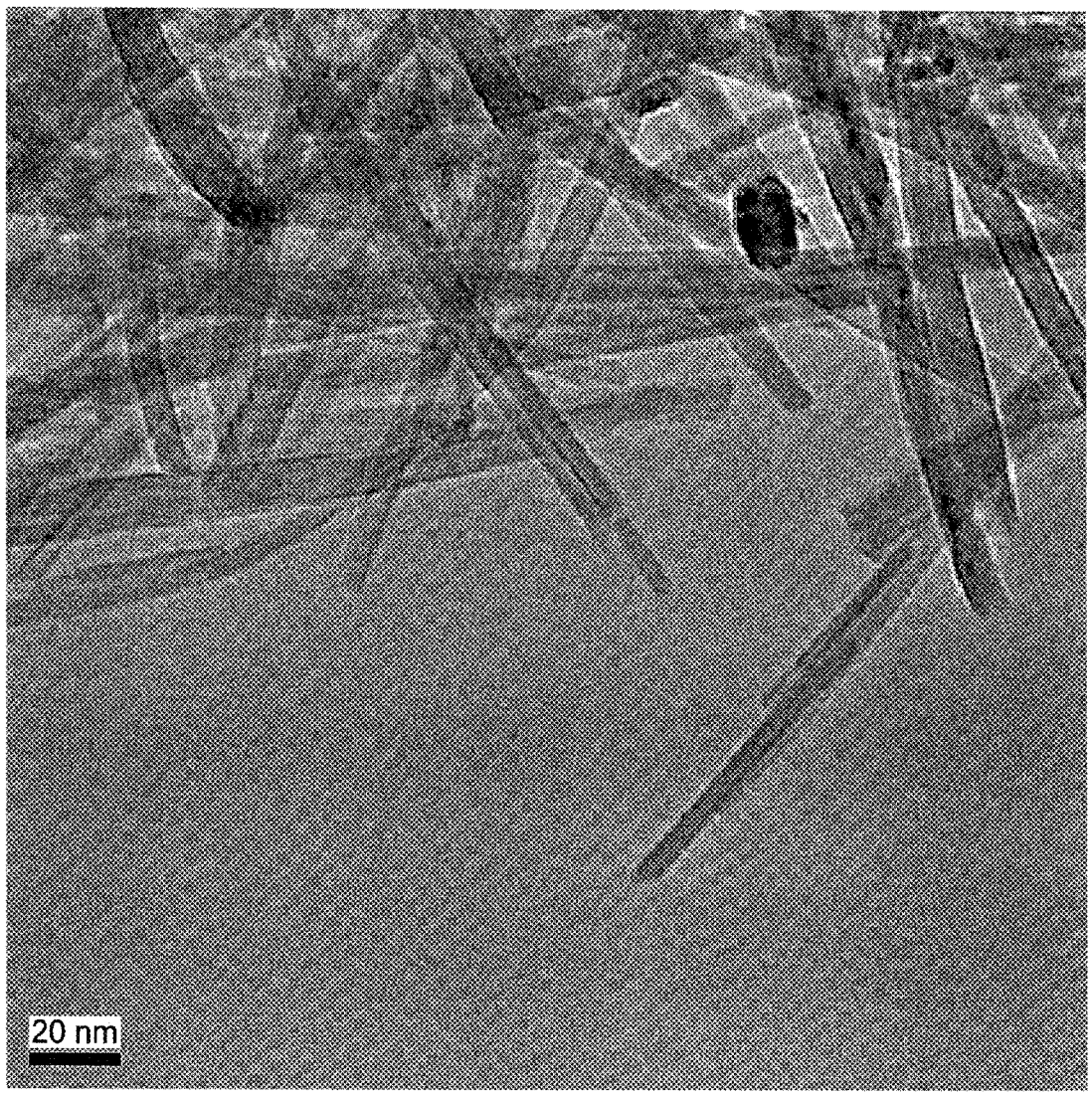
FIG. 3 shows transmittance electron microscope (TEM) images for the MONC nanowires.

If the crystals are randomly arranged, or have low degrees of periodicity, the result is a broader peak. Further characterizations were performed using SEM, TEM, and surface area analyses to explore the morphology and properties of the γ-$MnO_2$. The SEM images at different magnifications showed that γ-$MnO_2$ have a sea-coral shape in microstructure form, composed of nanowires with diameters between 20.0-40.0 nm as presented in FIGS. 2A-2B. The TEM images confirmed the shapes of the MONCs and their existence as nanowires with average diameter of 25.0 nm and a length of a few microns, as shown in FIG. 3. The average diameter in MNOCs was calculated manually from both SEM and TEM images based on 10 MONCs nanowires for each measurement. The nitrogen adsorption/desorption isotherms were measured at 77 K and the B.E.T.-specific surface area was calculated from them. The B.E.T. surface area was equal to 168.9 $m^2\ g^{-1}$, and total pore volume equaled 0.0742 $cm^3\ g^{-1}$.

EXAMPLE 2

MONCs Catalyst Testing

The MONCs were used to oxidize CO to $CO_2$ in the laboratory. The catalytic oxidation of CO by $O_2$ on MONCs surface was conducted at temperatures between 348 and 423 K. A stoichiometric mixture of CO and $O_2$ at a pressure of 4 Torr was used under a dynamic method. This method allows the measure of the drop in pressure of the reacting gases as a function of time and temperature in a closed circulating manifold system made of Pyrex glass. A fresh sample of MONCs, activated at 423 K for 3 hours, under a reduced pressure of $10^{-5}$ T was attained prior to adsorption of reacting gases. The conversion data was determined by gas chromatograph equipped with a thermal conductivity detector (TCD) detector with pure helium (He) as a carrier gas (20 ml $min^{-1}$).

Figure 4:
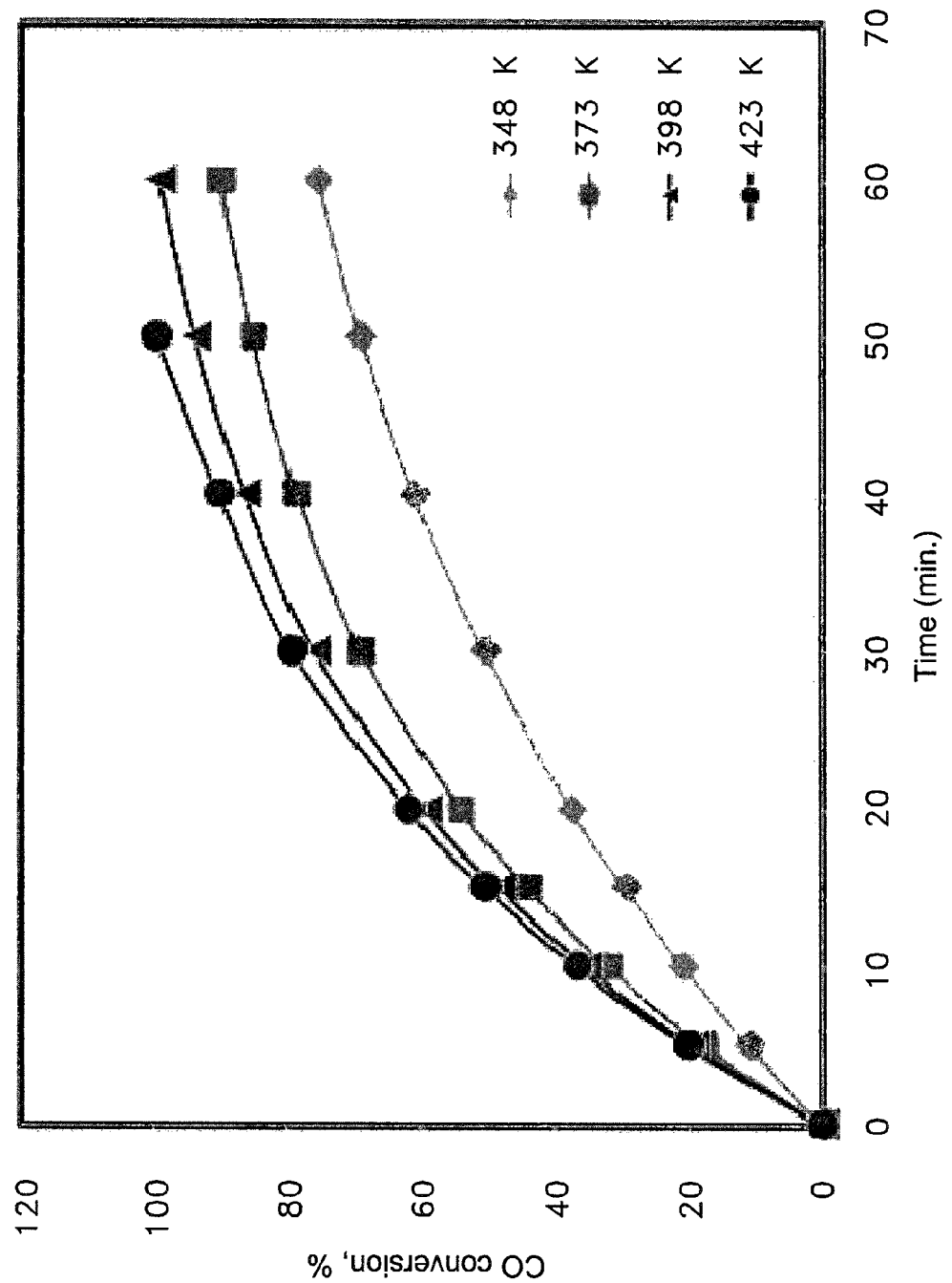
FIG. 4 is a graph showing the time-on-line data for the conversion of CO to $CO_2$ using MONCs at different temperatures, using 0.1 g MONCs.
Figure 5:
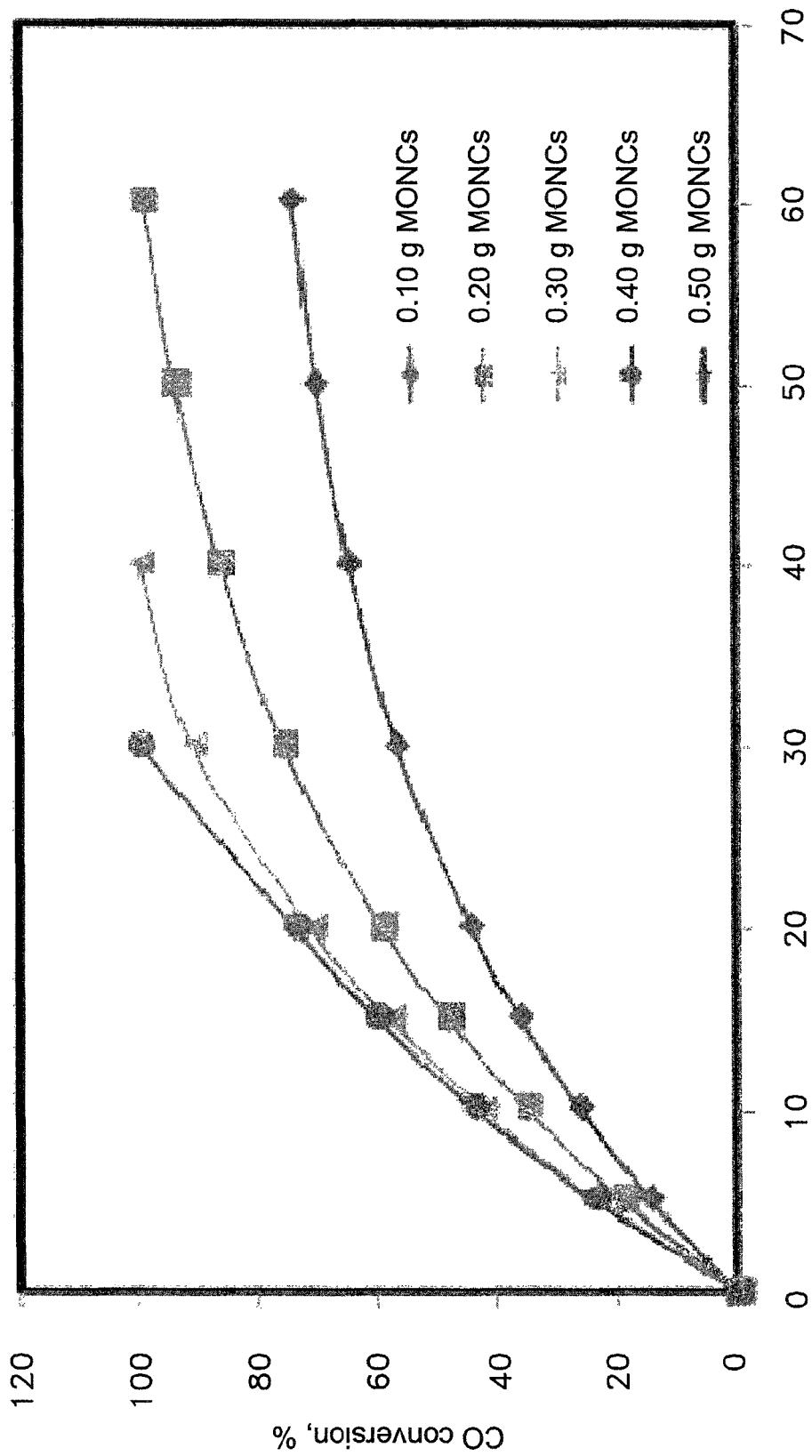
FIG. 5 is a graph showing the time-on-line data for the conversion of CO to $CO_2$ using different amounts of MONCs.

Conversion of carbon monoxide (CO) by MONCs results revealed that the conversion process significantly depended on the operational temperature and the amount of MONCs. Increasing the temperature greatly enhanced the conversion of CO, indicating the endothermic nature of the reaction. The maximum CO conversion of 100% was achieved at a temperature of 423 K (150° C.) within 50 min as shown in FIG. 4. Also, the results showed that increasing the MONCs dosage accompanied with significant increase in the percentage of carbon monoxide (CO) conversion (FIG. 5). This effect is due mainly to the availability of more active sites. The results revealed that 100% CO conversion could be obtained using 0.2 g MONCs within 60 minutes at 348 K (75° C.), and that this effect could also be achieved within 30 minutes by using 0.4 g MONCs at the same temperature.

Using the manganese oxide nanocoral catalysts (MONCs) described herein, carbon monoxide could be eliminated easily from the environment by catalytic oxidation process at normal conditions. The active MONCs could be synthesized easily in the laboratory at ordinary conditions.

It is to be understood that the present invention is not limited to the embodiments described above, but encompasses any and all embodiments within the scope of the following claims.

We claim:

1. A method of synthesizing manganese oxide nanocorals comprising:
    (a) heating a potassium permanganate solution;
    (b) providing manganese sulfate in a basic solution;
    (c) adding the manganese sulfate basic solution drop-wise to the heated potassium permanganate solution until a brown precipitate is formed;
    (d) stirring the brown precipitate at a temperature greater than 300 K;
    (e) isolating the precipitate; and
    (f) drying the precipitate to provide the manganese oxide nanocorals.

2. The method of synthesizing manganese oxide nanocorals according to claim 1, wherein the potassium permanganate solution is heated to a temperature of about 343 K.

3. The method of synthesizing manganese oxide nanocorals according to claim 1, wherein the brown precipitate is dried in an oven at a temperature of about 383 K.

4. The method of synthesizing manganese oxide nanocorals according to claim 1, wherein the brown precipitate is stirred for about 12 hours.

5. The method of synthesizing manganese oxide nanocorals according to claim 1, wherein the potassium permanganate solution is stirred at 600 rpm.

6. The method of synthesizing manganese oxide nanocorals according to claim 1, wherein the manganese oxide nanocorals include nanowires having a diameter of about 20 nm to about 40 nm.

7. The method of synthesizing manganese oxide nanocorals according to claim 1, wherein the manganese oxide nanocorals have a sea coral shape.

8. The method of synthesizing manganese oxide nanocorals according to claim 1, wherein the manganese oxide nanocorals have an orthorhombic γ-$MnO_2$ phase.

9. The method of synthesizing manganese oxide nanocorals according to claim 1, wherein the manganese oxide nanocorals have a B.E.T. specific surface area of about 168.9 $m^2\ g^{-1}$ and a total pore volume of about 0.0742 cm3 $g^{-1}$.

* * * * *